Feb. 15, 1966 R. E. PAIGE 3,235,431
METHOD OF PRODUCING HONEYCOMB ARTICLES
Filed Aug. 27, 1962 3 Sheets-Sheet 1

INVENTOR.
Richard E. Paige
BY
*Hovey, Schmidt, Johnson & Hovey*
ATTORNEYS.

Feb. 15, 1966   R. E. PAIGE   3,235,431
METHOD OF PRODUCING HONEYCOMB ARTICLES
Filed Aug. 27, 1962   3 Sheets-Sheet 2

INVENTOR.
Richard E. Paige
BY
ATTORNEYS.

Feb. 15, 1966 R. E. PAIGE 3,235,431
METHOD OF PRODUCING HONEYCOMB ARTICLES
Filed Aug. 27, 1962 3 Sheets-Sheet 3

INVENTOR.
Richard E. Paige
BY
Hovey, Schmidt, Johnson & Hovey
ATTORNEYS.

United States Patent Office 3,235,431
Patented Feb. 15, 1966

3,235,431
METHOD OF PRODUCING HONEYCOMB
ARTICLES
Richard E. Paige, New York, N.Y., assignor to Hallmark
Cards Incorporated, Kansas City, Mo., a corporation
of Missouri
Filed Aug. 27, 1962, Ser. No. 219,394
4 Claims. (Cl. 156—197)

This invention relates to a method of producing articles from honeycomb paper and particularly multicolored articles which are used for decorative purposes and the like, the colors desired for the finished article being applied to the paper prior to its formation into honeycomb and subsequently into the finished article.

The cellular material known as honeycomb has been in wide use for various purposes for some length of time but has come into recent use in the manufacture of decorative articles in the nature of figures, ornaments, festoons and the like. The wide acceptance of such articles has led to a search for economies in the production thereof and improvements in the appearance thereof. Specifically, the known methods of manufacturing such decorative articles from honeycomb material are inadequate to present a desirable finished article, particularly so far as the color thereof is concerned, there not being heretofore known any satisfactory, successful and yet economical method of applying color to the paper or the finished article whereby to achieve the desired color characteristics in the finished piece.

The most common method of forming colored honeycomb articles is to form several mats of paper, each of a single color, and subsequently die cut each mat into the particular part of the finished article desired to have the color of that mat. These individual solid colored components are then suitably secured to a cardboard backing or "spine" whereby to interconnect the components and create a finished article having the desired over-all color characteristics. This method is unsatisfactory inasmuch as several different components must be combined to create the finished article, and when the article is moved to its open or display position, the cellular pattern of the article is inconsistent at the points of interconnection of the components, thus leaving gaping and unsightly spaces between the separately colored components.

Other methods of producing multicolored honeycomb articles involve the forming of the article from a mat of a single color, normally white, and subsequently painting the finished article through the use of an air brush or spray, which process is extremely time-consuming, uneconomical, and wholly unsatisfactory where extremely cheap labor is not available.

Other attempts to create multicolored honeycomb articles have taken the form of creating a finished article from a mat of a single color and then dipping the article into baths of color or brushing the absorbent edges of the article with a suitable color.

The above methods of manufacture have been found to be impractical when it is desired to manufacture articles in large quantities inasmuch as they require an excessive amount of handling of the material and an undesirable amount of labor in assembling or coloring the finished article.

It is, therefore, the primary object of this invention to provide a method of producing honeycomb articles which utilizes known equipment now in use in the printing field and in the field of fabrication of honeycomb mats. In the present method such equipment is used to first print at least one stripe of color on a continuous length of material, the material then having lines of adhesive applied longitudinally of at least one of the surfaces thereof and in parallel relationship to the stripes of color on said surface by conventional equipment heretofore used in the production of honeycomb, the lines of adhesive on alternate surfaces being offset, as is the practice in the production of honeycomb; the length of material then being wound upon a drum and subsequently cut into a mat wherein the stripes of color are in vertical register and vary transversely of the mat according to the color characteristics desired for the finished article.

It is a further aim of this invention to provide a method of producing honeycomb articles wherein the mat from which the finished article is cut is formed from a plurality of superposed sheets, each of said sheets having at least one stripe of color applied thereto prior to its being made a part of the mat, the spaced-apart lines of adhesive also being applied to the individual sheets prior to their formation into a mat and functioning to secure the sheets together and create the cellular pattern of honeycomb appearance desired in the finished article.

It is yet another object of this invention to provide a method of producing honeycomb articles wherein the stripes of color are placed upon the length of material longitudinally thereof and in such a manner that it is not necessary to have a longitudinal register of the stripes of color, the only register necessary being lateral, that is insuring that the side edges of the corresponding stripes of color are in vertical alignment as the sheets are stacked during their formation into the mat. Such a method allows the utilization of presently known equipment which involves the use of a winding drum upon which several lengths of preprinted material are simultaneously wrapped or wound, the one-way register above mentioned compensating for the fact that the lengths of material successively wound upon the drum are of varying circumference. Thus, while longitudinal register of the stripes printed on the length of material would be impossible with presently known equipment for forming honeycomb mats, the present method accommodates itself to such equipment in that there is only a one-way register of the stripes of color and such register may be maintained even though the lengths of material upon which such stripes are printed are wound about a drum.

A yet further aim of this invention is to provide a method of producing articles from a preprinted honeycomb mat, which articles can be of several different color characteristics depending upon the nature and number of stripes of color applied to the sheets which form the mat and the particular manner in which the mat is die cut to form the finished article, it being contemplated that virtually any number of different preselected lines of cut may be followed when forming the article from the mat, depending upon the appearance and type of coloring desired in the finished article.

Yet another object of this invention is to provide a method of producing multicolored, decorative honeycomb articles wherein the paper which forms the mats from which the finished articles are cut is preprinted in such a manner that the areas of color in the finished article are precise and well defined and the mats themselves are cut in such a manner that the color areas cooperate to define or portray finished articles of the desired design and appearance, which articles have interior detail that cannot be achieved by presently known methods.

It is still another object of this invention to provide a method of producing articles from a honeycomb material, which articles are aesthetically pleasing in their over-all appearance, and which articles may be economically and rapidly formed through the use of preprinted sheets of material, the color characteristics of the finished article being superior to those heretofore known in decorative honeycomb articles.

Other objects of this invention will become apparent from the following specification and accompanying drawings, wherein.

The method of producing honeycomb articles hereinafter described is particularly intended to be compatible with presently known equipment utilized in printing lengths of paper material and in applying lines of adhesive thereto whereby such present known equipment may be advantageously used.

Figure 1:
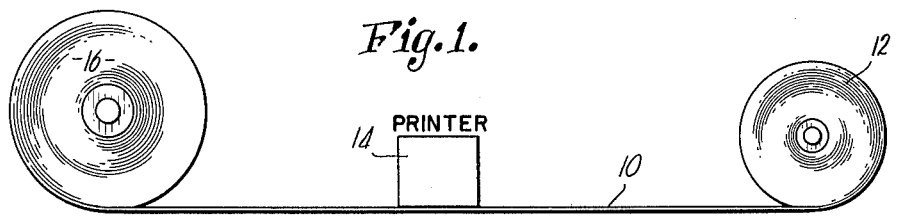
FIGURE 1 is a schematic view illustrating the manner in which the stripes of color are printed upon a length of material.

The method of printing the length of paper material 10 is schematically illustrated in FIG. 1 of the drawings. A roll of paper 12 which is normally in the form of white tissue paper of grade 10, or a suitable tissue paper-like material, furnishes a length of material 10 which passes from roll 12 beneath or through a printer 14 whereby the printer 14 may apply to the length of material 10 at least one, and normally a plurality, of longitudinally extending stripes of color, the particular color of the various stripes applied depending upon the desired color characteristics of the finished article.

While white tissue is preferably used in the present method, it will be appreciated that the length of material 10 might also be a colored tissue. The printer 14 may be adapted to print the desired stripes of color on either one or both surfaces of the length of material 10. However, rather than actually printing both surfaces, it has been found that if a grade 10 tissue is printed on one side with aniline inks, the color will soak through the fibers of the tissue and thereby form a color stripe on both surfaces of the length of material. While such a method of one surface printing is desirable from a standpoint of economy, it will be appreciated that absolutely true and identical shades of color for a given stripe on both surfaces of the material, can best be achieved by utilizing printer 14 to actually print said given stripe of color on both surfaces of the length of material 10 as it passes through printer 14.

After passing through the printer 14 the length of material is wound upon a cylinder 16 and the cylinder of preprinted material subsequently stored for later use or moved immediately to the apparatus schematically illustrated in FIG. 2 which shows the manner in which a plurality of longitudinally extending lines of adhesive are applied to the lengths of preprinted material such as 10 which emanate from cylinders 16. Thus, a plurality of cylinders such as 16 may be disposed in suitable relationship whereby to simultaneously pass identically printed lengths of material 10 over corresponding adhesive-applying heads 18, the lengths of material then being wound about a drum 20 the desired number of revolutions whereby to superpose the same in layers of the desired thickness.

Suitable apparatus (not shown) is coupled with the winding drum 20 whereby to maintain the stripes of color which have been printed upon lengths of material 10 in lateral register as they move onto the drum 20 from cylinders 16.

Figure 2:
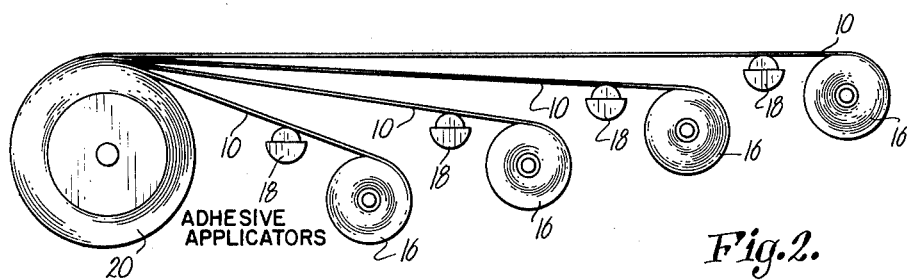
FIG. 2 is a schematic view illustrating the manner in which lines of adhesive are applied to a plurality of lengths of preprinted material.

Depending upon the finished article desired, the lengths of material 10 may be superposed upon drum 20 in any desired thickness from a very few layers thereof to in excess of 150 layers, it being noted that in the schematic illustration of FIG. 2, each revolution of drum 20 would accumulate four layers of material thus allowing a rapid build-up of the lengths of material 10 about drum 20. It will be appreciated that due to the longitudinal disposition of the stripes of color upon the lengths of material, the same are maintained in register as said lengths 10 are wound about drum 20 notwithstanding the increasing circumference of each successively applied length of material 10.

Figure 3:
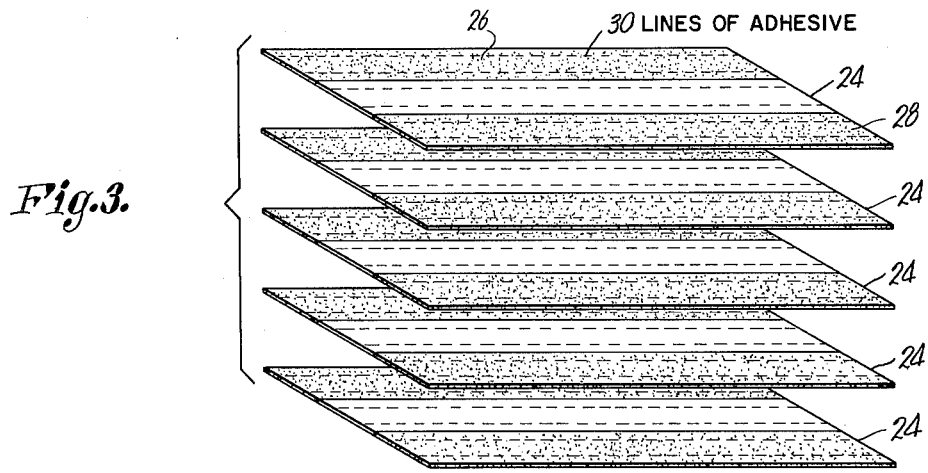
FIG. 3 is an exploded view showing several sheets of material having the stripes of color and lines of adhesive applied thereto.
Figure 4:
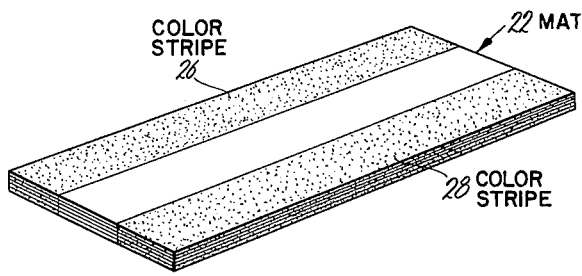
FIG. 4 is a perspective view of a finished mat made from such sheets of material.

When the desired number of layers of lengths of material 10 about drum 20 have been created, a single transverse cut is made whereby to sever the layers of material from the drum 20 and create a mat 22 illustrated in its finished form in FIG. 4 of the drawings, the mat being formed from a plurality of superposed sheets of material 24 illustrated in FIG. 3 of the drawings.

In FIG. 3 of the drawings each of the sheets 24 has been illustrated as having two stripes of color 26 and 28 applied thereto, although it will be appreciated, as hereinafter pointed out, that there may be any number of such stripes of color, depending upon the color characteristics desired in the finished article.

The stripes 26 and 28 extend longitudinally of the sheets 24 as do the lines of adhesive 30 which are, therefore, in parallel relationship to the stripes 26 and 28 on the same surface of the sheet 24, the lines of adhesive being offset on alternate surfaces. Thus, as the sheets of material are superposed, the lines of adhesive 30 will serve to secure the same together along spaced-apart, longitudinally extending lines of securement. Inasmuch as the sheets 24 are identically printed, the stripes of color 26 and 28 combine, when the sheets are formed into a mat as shown in FIG. 4, to form a solid area of color extending both longitudinally and vertically of the mat 22.

When a mat such as 22 has been formed, the same may then be utilized to form a finished article by cutting the mat 22 along preselected lines whereby to define a blank for the finished article. For example, the mat 31 fragmentarily illustrated in FIG. 5 of the drawings, has a plurality of lines of color extending longitudinally thereof throughout the thickness of the mat, the particular mat 31 shown in FIG. 5 being preprinted for use in forming a finished article in the nature of a Santa Claus.

Thus, there is a stripe of black 32; a stripe of material which has been left white or printed in white designated as 34; a red stripe 36; a second white strip 38; a red stripe 40; a black stripe 42; a red stripe 44; a white stripe 46; a flesh colored stripe 48; a white strip 50; a red stripe 52; and a final white stripe 54.

To form the finished article from the mat 31 the same is cut along a line of cut 56 which extends generally transversely of the mat and perpendicularly to the stripes of color 32–54, one portion 58 of the line of cut 56 defining the outer contour of the finished figure and another portion 60 of the line of cut 56 forming the axis about which the blank 62 is folded when it is removed from the mat. Subsequent to the formation of the blank 62, a piece of cardboard is attached to each of the exterior flat surfaces thereof, said pieces of cardboard combining to form a back or "spine" for the finished article, which finished article is shown in FIG. 6 of the drawings.

Figure 6:
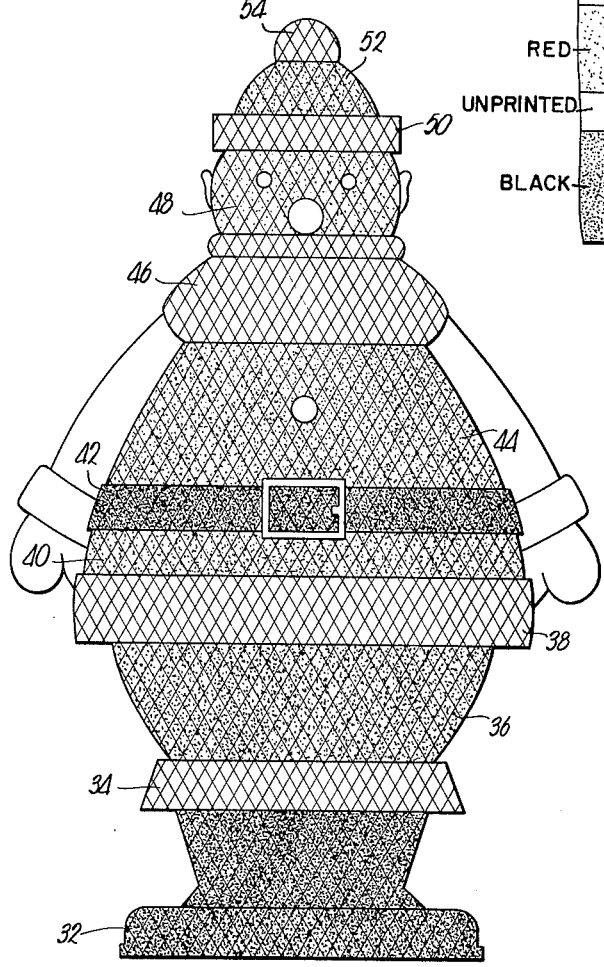
FIG. 6 is a front elevational view of a finished article formed from the blank illustrated as being cut in FIG. 5, the article being in the nature of a Santa Claus figure.

Subsequent to the application of the backing cardboard, the blank 62 is opened by folding the same outwardly and by moving the two pieces of cardboard carried by the flat exterior surfaces of the blank 62 into engagement whereby to create a fully formed, three-dimensional figure having the stripes of color disposed horizontally thereof as shown in FIG. 6 to thereby create the desired overall appearance. Thus, in a finished article such as the Santa Claus figure shown in FIG. 6, black stripe 32 forms the boots of the figure; the stripe of white 34 forms the tops of the boots; stripe of red 36 forms the pants of the figure; stripe of white 38 forms the coattails of the figure; stripe of red 40 forms the lower part of the coat of the figure; stripe of black 42 forms the belt of the figure; stripe of red 44 forms the upper portion of the coat of the figure; stripe of white 46 forms the beard and mustache of the figure; stripe of flesh 48 forms the face of the figure; stripe of white 50 forms the band of the hat of the figure; stripe of red 52 forms the intermediate portion of the hat of the figure; and stripe of white 54 forms the tassel on the hat of the figure. As illustrated in FIG. 6 various cutout cardboard pieces may be appropriately inserted in the finished honeycomb article whereby to define a belt buckle, buttons, arms, eyes, nose, ears and other desired features.

Figure 5:
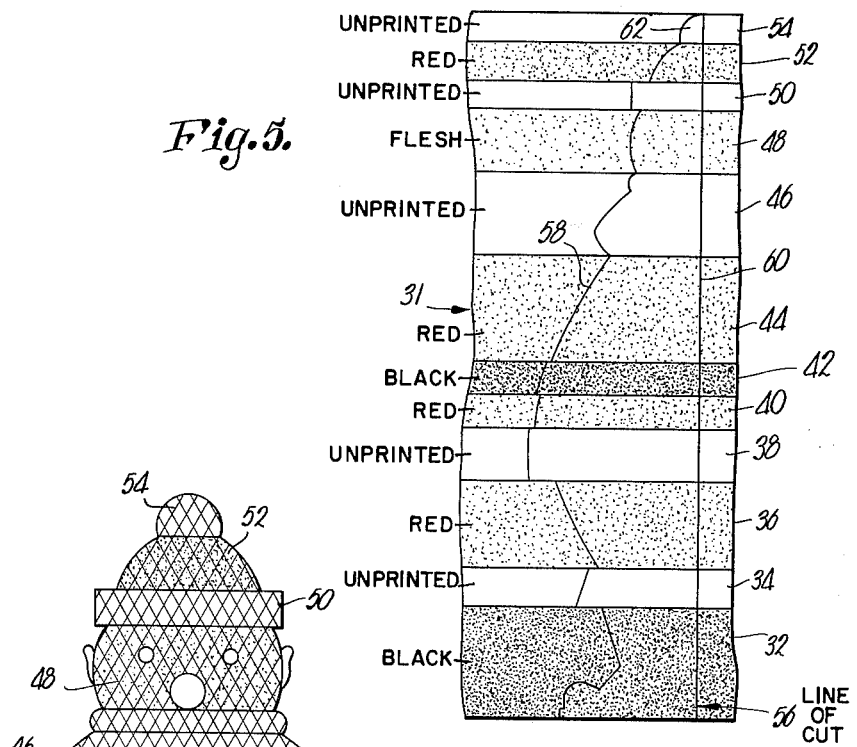
FIG. 5 is a fragmentary, plan view of a mat having multiple stripes of color thereon and showing the lines of cut followed in forming a certain type of finished article.

Thus, it is seen that to create a Santa Claus figure such as illustrated in FIG. 6 of the drawings, it is merely necessary to predetermine the colors desired for the finished article, and to then print these colors upon a length of material in the form of stripes extending longitudinally of the length of material, the length of material then being utilized to form a mat from which the blank for the finished article may be cut by cutting along preselected lines such as illustrated in FIG. 5 of the drawings, the lines of cut being disposed generally transversely of the mat when it is desired to have the stripes of color extend horizontally of the finished article.

Figure 7:
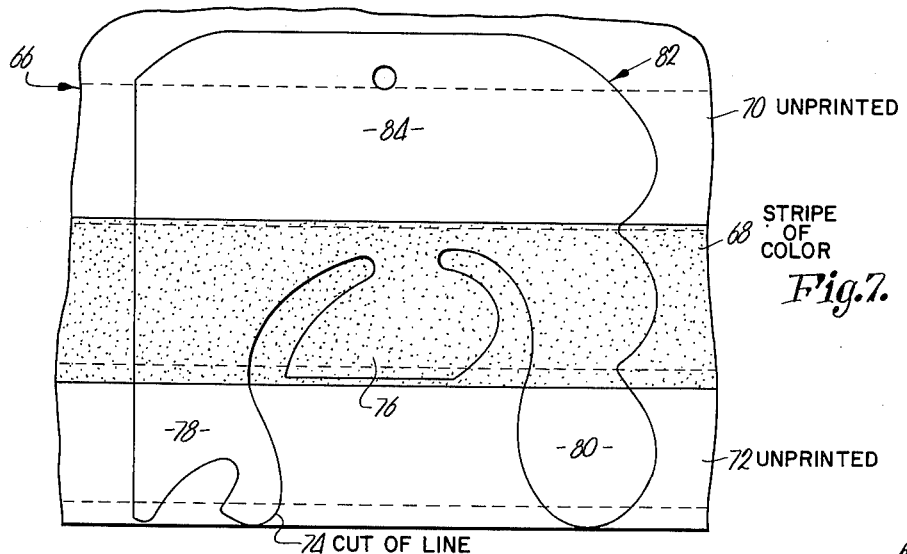
FIG. 7 is a fragmentary, plan view of a mat illustrating a line of cut which may be followed in forming yet another type of finished article.
Figure 8:
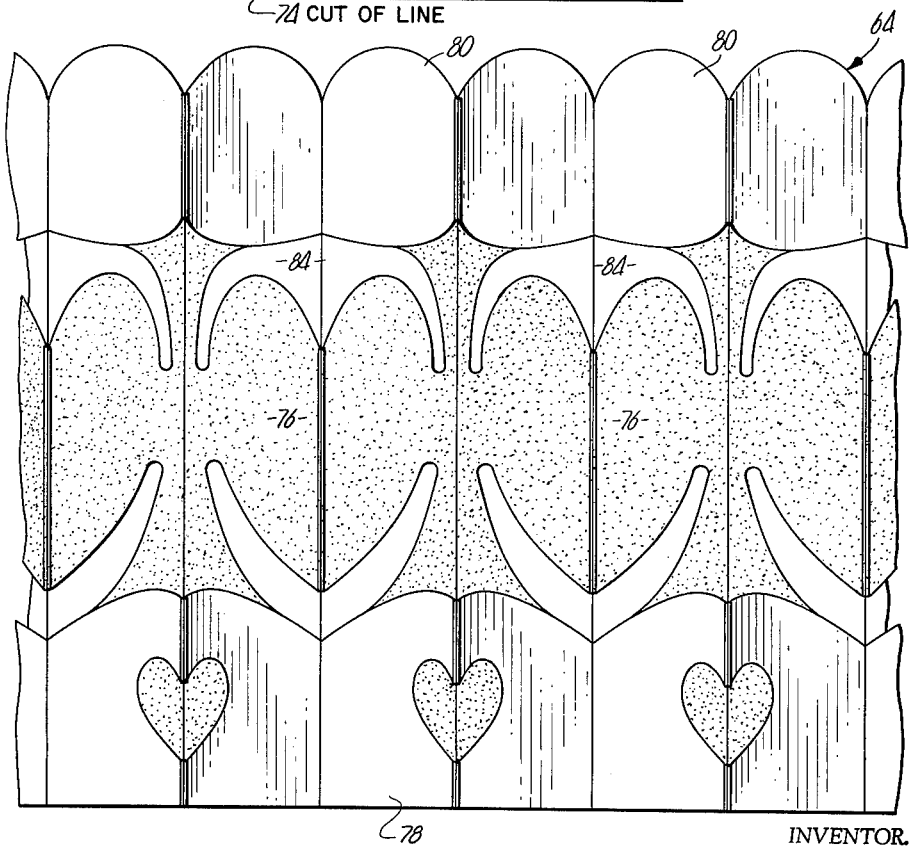
FIG. 8 is a fragmentary, front elevational view of the finished article illustrated as being cut in FIG. 7, this article being in the nature of a festoon.

FIGS. 7 and 8 illustrate yet another form of finished article which may be created through the utilization of a preprinted length of material which has been subsequently fomred into a mat as hereinabove described, the finished article illustrated in FIG. 8 and designated as 64 being in the nature of a festoon.

The festoon 64 is formed from a mat of material such as 66 which has a single stripe of color 68 extending longitudinally thereof and vertically therethrough, the remaining portion of the mat 66 having been allowed to remain white in color whereby to define a pair of white stripes 70 and 72 disposed in bracketing relationship to the red stripe 68.

To form the festoon 64, the mat is cut along line of cut 74 which extends generally transversely of the mat 66, although certain portions of the lines of cut 74 are substantially longitudinally disposed with respect to the mat 66, all as is fully apparent from FIG. 7 of the drawings.

In following line of cut 74, the red stripe of color is cut in such a manner that a portion of the finished article 76 which would be red in color, extends between a pair of wings 78 and 80 which would be white in color when viewing the blank 82, as shown in FIG. 7, there being a remaining portion 84 which would be white in color and serve as a background for the red portion 76.

After the blank 82 has been created by cutting along line of cut 74, a sheet of cardboard material is applied to each of the exteriorly disposed flat sheets of material from which the blank 82 is formed whereby to provide a backing for the finished article. The blank is then inverted whereby to dispose the stripe of color 68 vertically thereof, and by pulling apart upon the "spine" or backing sheets, the festoon shown in FIG. 8 is created, it being noted that the portion 76 defines a red heart which is in effect framed by the white portions 78 and 80, the white portion 84 serving as a background for the red heart. Thus, the stripe of red color is disposed within a centrally positioned plane with respect to the remaining portions of the festoon 64, and a very aesthetically pleasing effect is created.

It will be appreciated that many variations of finished articles can be created through the utilization of the method hereinabove described, depending upon the various colors which are preprinted onto the sheets of material forming the mat and the manner in which the mat is cut to define the finished article. It is also obvious that many variations of the present invention can be utilized without departing from the spirit thereof such as the utilization of stripes of colored dots; lines or repetitive stripes of color rather than a continuous stripe of color as hereinabove described; and many other variations which would be limited only by the ingenuity of the artist and designer.

Having thus described the invention, what is claimed as new and desired to be secured by Letters Patent is:

1. A method of producing honeycomb articles which includes the steps of printing at least one stripe of color on each of a plurality of sheets of material; applying spaced apart lines of adhesive to said sheets of material; superposing said sheets of material with the lines of adhesive alternately staggered; aligning the edges of said sheets of material whereby to maintain said stripes of color substantially in register; securing said sheets together along said spaced apart lines of adhesive whereby to form a mat; and cutting said mat along selected lines whereby to define an article of predetermined configuration.

2. A method of producing honeycomb articles as set forth in claim 1 wherein said stripes of color and said lines of adhesive extend longitudinally of said mat and said lines of cut extend transversely of the mat and generally perpendicular to said stripes of color and said lines of adhesive.

3. A method of producing honeycomb articles as set forth in claim 1 wherein said sheets of material are permeable in nature and said printing is done with an ink capable of permeating each sheet as it is printed whereby to form a stripe of color on both surfaces of each sheet with a single printing.

4. A method of producing honeycomb articles which includes the steps of printing at least one continuous stripe of color on a length of material; applying spaced apart lines of adhesive to at least one surface of said length of material in parallel relationship to the stripe of color on said one surface; winding said length of material about a drum whereby to superpose layers thereof; aligning the edges of said layers of material whereby to maintain said stripes of color substantially in register; securing the superposed layers of said length of material together along said spaced apart lines of adhesive, said lines of adhesive being alternately staggered; severing said superposed layers along a given line whereby to form a mat; and cutting the mat along selected lines whereby to define an article of predetermined configuration.

References Cited by the Examiner

UNITED STATES PATENTS

| | | | |
|---|---|---|---|
| 1,616,568 | 2/1927 | Beistle | 161—17 |
| 1,809,635 | 6/1931 | Luhrs | 161—14 |
| 2,072,858 | 3/1937 | Ellis | 156—277 |
| 2,089,563 | 8/1937 | Luhrs | 161—17 |
| 2,346,824 | 4/1944 | Cohen | 161—14 |
| 2,549,802 | 4/1951 | George et al. | 156—197 |
| 2,631,643 | 3/1953 | Schueler | 156—240 |
| 2,704,904 | 3/1955 | Maas | 161—14 |
| 2,973,294 | 2/1961 | McClelland | 161—68 |

EARL M. BERGERT, *Primary Examiner.*